Figures 1, 2, 3:
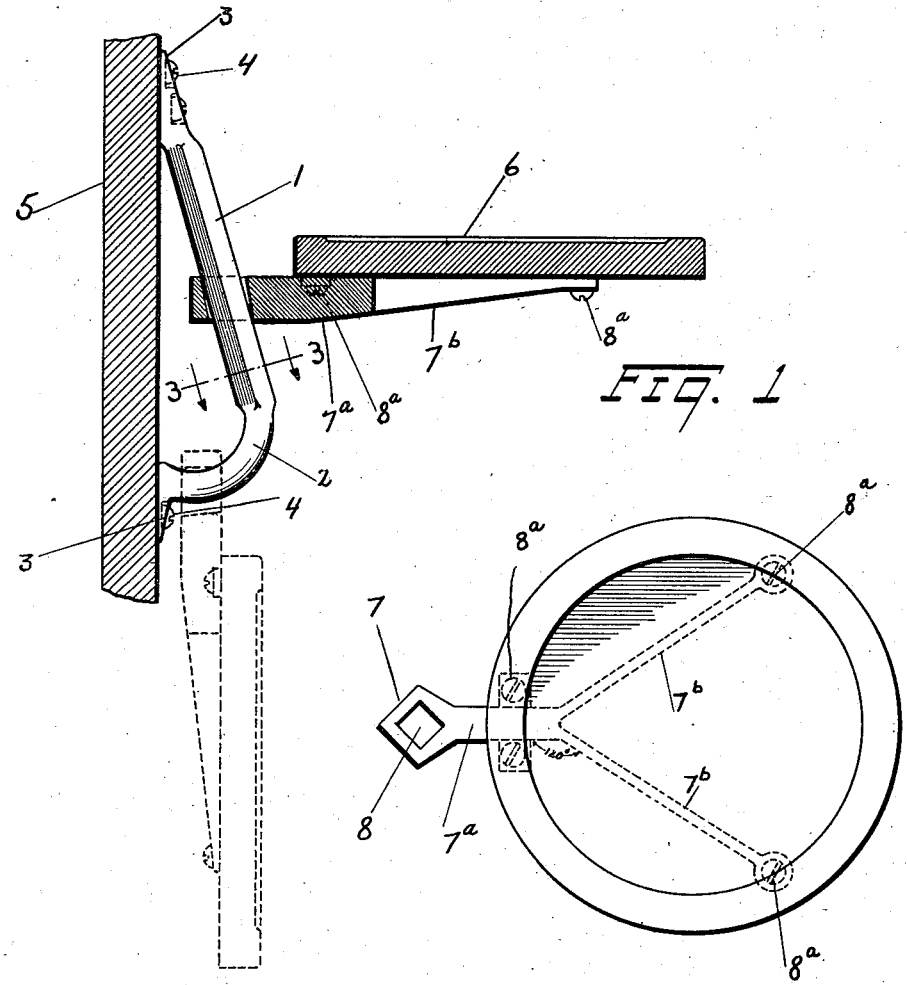

July 3, 1923.

W. C. LISTER

ADJUSTABLE SEAT

Original Filed April 7, 1922

1,460,721

INVENTOR

Patented July 3, 1923.

1,460,721

UNITED STATES PATENT OFFICE.

WILLIAM COATES LISTER, OF TORONTO, ONTARIO, CANADA.

ADJUSTABLE SEAT.

Application filed April 7, 1922, Serial No. 550,479. Renewed May 11, 1923.

*To all whom it may concern:*

Be it known that I, WILLIAM COATES LISTER, of the city of Toronto, in the county of York and Province of Ontario, Dominion of Canada, have invented certain new and useful Improvements in Adjustable Seats; and I hereby declare that the following is a full, clear, and exact description of the same.

This invention relates to an adjustable seat comprising a seat element, provided with a forked supporting arm secured to its under surface and projecting beyond its perimeter, the projecting part of the supporting arm being formed with a through-aperture at approximately right angles to its plane; and a bracket consisting of a stanchion, loosely inserted through said aperture and binding against its diagonally opposite edges for supporting the seat element when extended at an angle to the stanchion, and a curved base member for holding the seat element suspended when lowered out of engagement with the stanchion, as herein set forth and particularly pointed out in the claim.

In the drawings:

Fig. 1 is a sectional elevational view, showing in full lines the seat element extended horizontally from the stanchion, and showing in dotted lines the seat element suspended from the curved base member, Fig. 2 is a plan view of the seat element and supporting arm, and Fig. 3 is a cross-sectional view on the line 3—3 Fig. 1.

Like characters of reference refer to like parts throughout the specification and drawings.

In the preferred construction the supporting bracket consists of a stanchion 1 and a curved base member 2 each provided with apertured lugs 3, through which are inserted screws 4 to fasten the supporting bracket to an attaching structure 5.

The base member 2 is preferably circular in cross-section and its diameter is slightly less than that of the stanchion 1. The stanchion 1 may be of any geometric shape in cross-section but is shown in Fig. 3 to be rectangular. The seat element 6 may be of any usual or preferred type and is provided with a supporting arm 7 secured to the under surface by screws $8^a$. The supporting arm 7 as shown in Fig. 2, consists of a shank $7^a$ and two forks $7^b$ which form an angle of approximately 120° with the shank so as to provide three substantially equally distributed bearing surfaces beneath the seat element. The shank $7^a$ extends beyond the seat element as shown in Figs. 1 and 2 and formed through it is an aperture 8 of corresponding shape to the stanchion 1. The through-aperture 8 is at approximately right angles to the plane of the arm, and the diameter of the aperture 8 is slightly greater than the diameter of the stanchion, so that the arm can freely slide lengthwise on the stanchion during the adjustment of the seat element to the desired elevation within the limits of the supporting bracket. The supporting bracket shown in Fig. 1 is so constructed that the stanchion 1 is inclined with relation to the support 5, the inclination taking a downwardly-outwardly direction from the upper lug 3 to provide a base member 2 of sufficient curved length for the suspension of the seat element when lowered to the perpendicular position shown in dotted lines in Fig. 1.

The seat element when not in use is suspended from the base member 2 as shown in dotted lines in Fig. 1. When it is intended to use the seat element the arm 7 is moved in an upward direction along the base member 2 and stanchion 1 to the desired elevation for the seat, the outer end of the seat element during this movement being supported so that the axis of the through-aperture 8 may be parallel with the axis of the stanchion 1. When the seat element has been lifted to its desired elevation the lifting force is removed and the seat element and the arm 7 then assume the position shown in Fig. 1, in which position the diagonally opposite edges of the surface surrounding the through-apertures 8 bind upon the stanchion and lock the stanchion and arm together.

To maintain the seat element 6 in a horizontal plane when in the position shown in Fig. 1, it is preferable to arrange the through aperture 8 at a slight inclination to the plane of the supporting arm and in that case the axis of the through aperture will not form an angle of 90° with the plane of the arm but will approximate very closely to it. This explanation is given to define the statement that the through aperture is at approximately right angles to the plane of the arm.

Having thus fully described my invention, what I claim as new and desire to secure by Letters Patent is:—

An adjustable seat comprising a seat element, a forked supporting arm therefor projecting beyond the seat element formed with a through-aperture at approximately right angles to its plane and a supporting bracket consisting of a stanchion loosely inserted through said aperture and binding against its diagonally opposite edges for supporting the seat element when extended at an angle to the stanchion, and a curved base member for holding the seat element suspended when moved out of engagement with the stanchion.

Signed at the said city of Toronto this twentieth day of March, A. D. 1922.

WILLIAM COATES LISTER.

Witnesses:
STANLEY RICHES,
BETTY COMPTON.